July 23, 1935.  H. T. SEELEY  2,009,097
SYNCHRONIZING APPARATUS
Filed May 26, 1934  2 Sheets-Sheet 1

Inventor:
Harold T. Seeley,
by Harry E. Dunham
His Attorney.

Patented July 23, 1935

2,009,097

UNITED STATES PATENT OFFICE 2,009,097

SYNCHRONIZING APPARATUS

Harold T. Seeley, Lansdowne, Pa., assignor to General Electric Company, a corporation of New York Application May 26, 1934, Serial No. 727,711

20 Claims. (Cl. 171—118)

My invention relates to improvements in synchronizing apparatus and more particularly to improvements in synchronism indicators and also in synchronizing devices for automatically controlling the closing operation of the means for connecting two alternating current circuits. One object of my invention is to provide improved synchronism indicating means which is particularly well adapted for use in remote control and supervisory systems. Another object of my invention is to provide an improved synchronizing device for starting the closing operation of the circuit connecting means sufficiently prior to synchronism regardless of differences, within practical operating limits, in phase, frequency and magnitude of the voltages of the circuits to allow for the closing time, assumed constant, of the connecting means so that connection will occur only when the voltages are in phase and have practically the same frequency. A further object of my invention is to provide a highly sensitive synchronizing apparatus which has relatively small energy requirements. These and other objects of my invention will appear in more detail hereinafter.

My invention will be better understood from the following description when considered in connection with the accompanying drawings and its scope will be pointed out in the appended claims.

Figure 1:
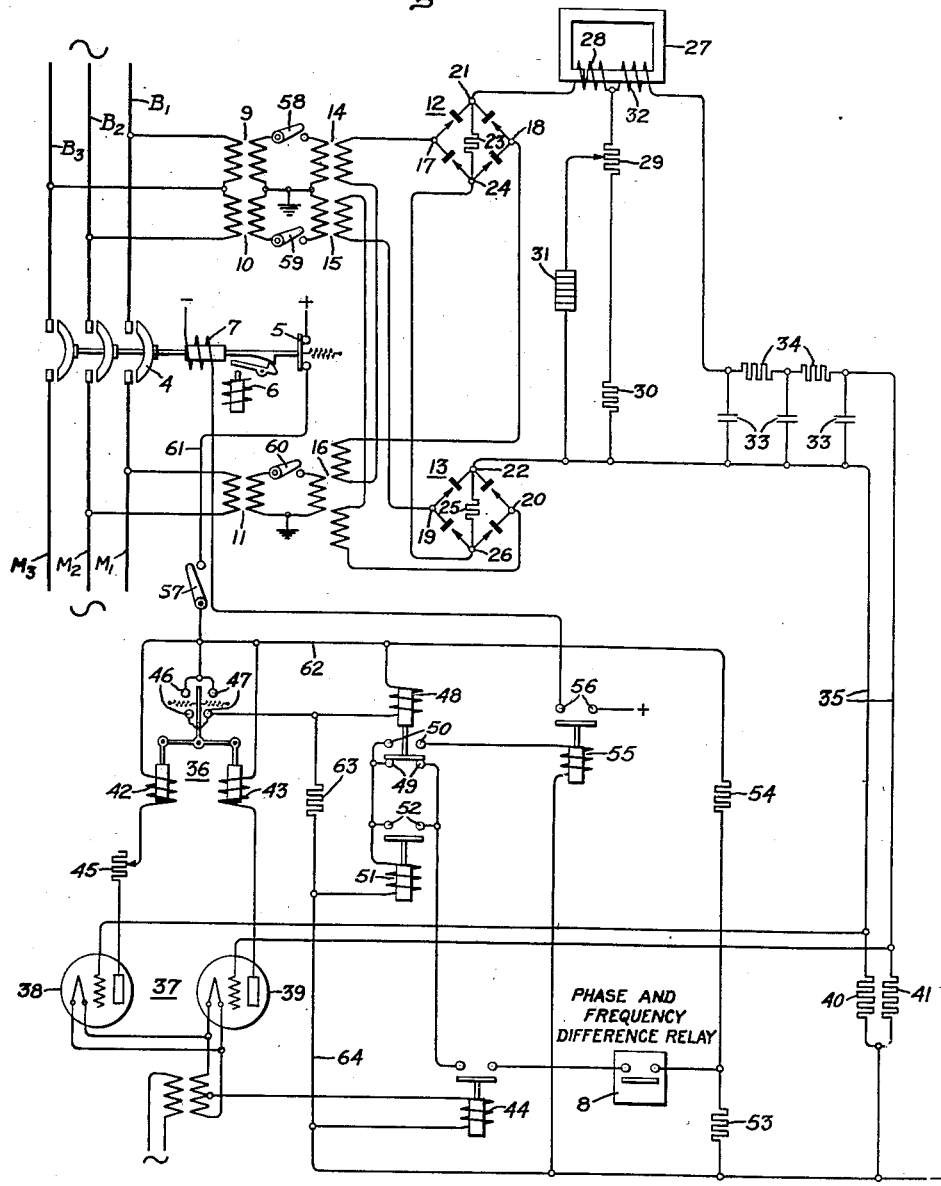
Figure 2:
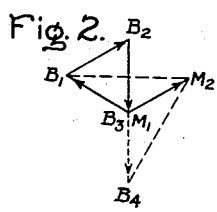
Figure 3:
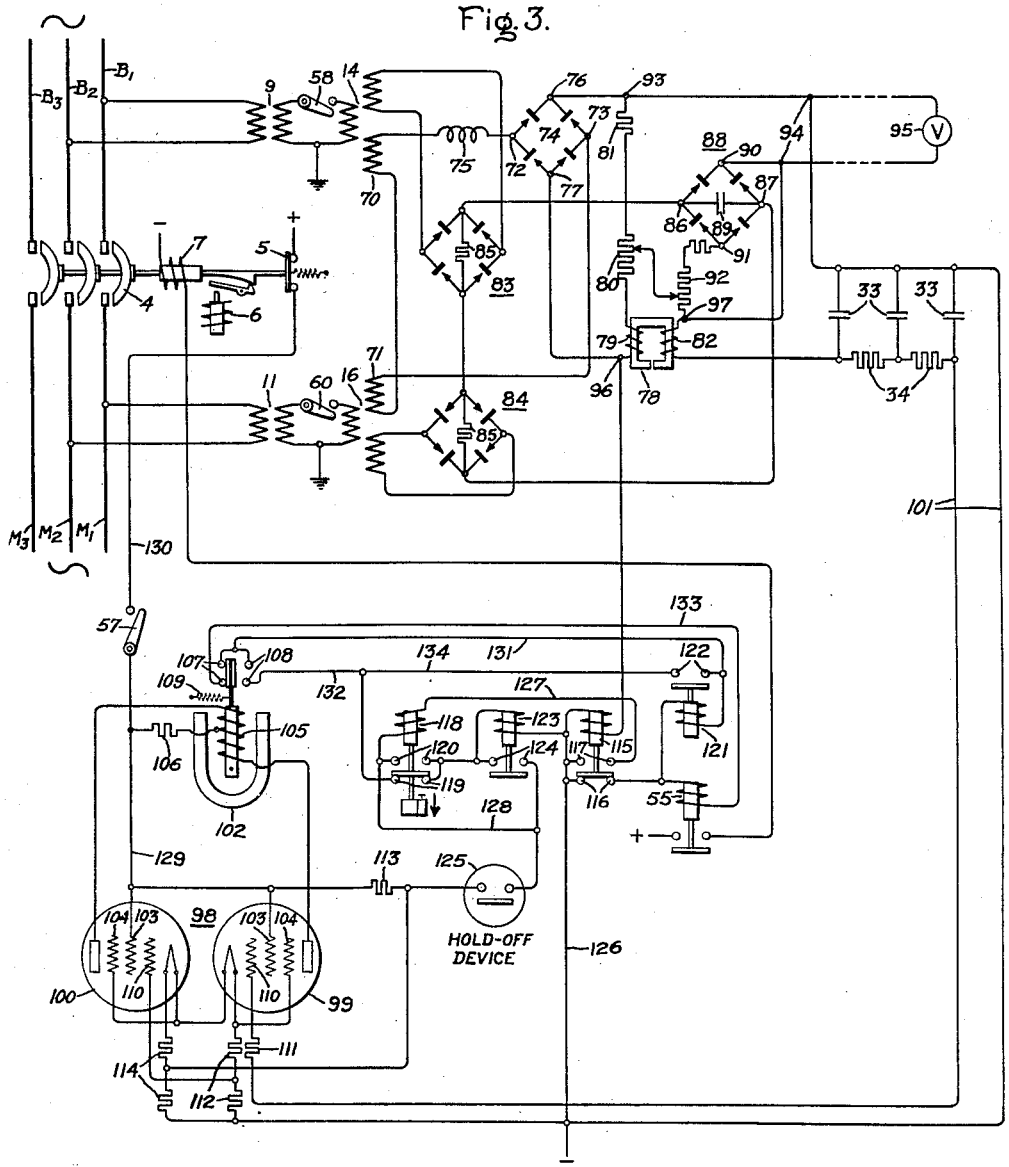

In the accompanying drawings, Fig. 1 illustrates diagrammatically an automatic synchronizing arrangement embodying my invention, Fig. 2 is a vector diagram explanatory of the embodiment of my invention shown in Fig. 1 and Fig. 3 illustrates diagrammatically another embodiment of my invention.

In the embodiment of my invention shown in Fig. 1, two polyphase alternating current circuits having conductors $B_1$, $B_2$, $B_3$ and $M_1$, $M_2$, $M_3$ respectively are arranged to be connected by any suitable means, such as a latched closed circuit breaker 4. For convenience, the circuits may hereinafter be referred to as the bus and machine sources since the conductors $B_1$, $B_2$, $B_3$ may represent a supplied bus or leads to a supplied bus, not shown, while the conductors $M_1$, $M_2$, $M_3$ may represent leads to a source of polyphase alternating current, not shown. The circuit breaker is provided with auxiliary switching means 5, a trip coil 6, and a closing coil 7. The auxiliary switching means 5 is so arranged as to be closed when the circuit breaker is open and vice versa. The energization of the trip coil 6 may be controlled in any suitable manner, as is well known to the art. The energization of the closing coil 7 is under the control of an automatic synchronizing arrangement embodying my invention.

In the embodiment of my invention shown in Fig. 1, I compare as the criterion for synchronism two voltages respectively dependent on the resultants of a voltage of one source compared separately with each of two voltages of the other source having the same magnitude of phase difference with respect to the voltage of the one source when the sources are in phase and a constant phase difference with respect to each other. Thus, referring to Fig. 2, $B_1B_2$, $B_2B_3$ and $B_3B_1$ represent the interphase voltages of the bus, $M_1M_2$ shown as of the same magnitude as $B_1B_2$, for purpose of illustration only, represents an interphase voltage of the machine and is shown in the in-phase position and $B_3B_4$ represents $B_2B_3$ translated. It is clear that the angle between $B_2B_3$ and $B_3B_1$ is constant and the angles between each and $M_1M_2$ have the same magnitude when the in-phase condition exists. The resultant voltage $M_2B_4$ of $M_1M_2$ and $B_2B_3$ ($B_3B_4$) is then equal to the resultant voltage $M_2B_1$ of $M_1M_2$ and $B_3B_1$ for the in-phase position. It will be noted that these resultant voltages will be equal to each other regardless of whether or not the machine and bus voltages have the same magnitude. While I have shown the resultant voltages as differences, it will be apparent that sums may be taken since they will also be equal in the in-phase position. As the in-phase position is approached, one resultant is greater than the other and on the other side of the in-phase position the reverse is true. The difference between the magnitudes of these resultant voltages $M_2B_1$ and $M_2B_4$ is, therefore, a measure of the phase angle between the electromotive forces of the bus and the machine. Incidentally, when $M_1M_2$ and $B_1B_2$ differ in phase by 180°, the resultant voltages are equal. To take care of this condition, where a comparison of the resultants might lead to a false indication, I provide suitable phase checking means 8 which will hereinafter be more fully described.

The interval of time $t$ between the instant at which indication to close the connecting means is given and the instant at which synchronism occurs is directly proportional to the phase angle, $\theta$ at that instant, and inversely proportional to the frequency difference or slip $s$, so that is $$t \propto \frac{\theta}{s}$$

Assuming a constant closing time T, it is obvious that if the breaker closing operation is to be initiated at any other than one fixed frequency difference or slip, correction must be made for the slip or rate of change of phase angle, that is $$\frac{d\theta}{dt}.$$

In order that the difference between the magnitudes of the resultants $M_2B_1$ and $M_2B_4$ may be used as the criterion for the phase angle, since at the instant of synchronism, for example, they are vectorially displaced 60°, each may be rectified and the envelope of the difference, which is a pulsating direct current $E_{dc}$, is at any instant proportional to the phase angle $\theta$, within the useful range of $\theta$. Since the frequency of the pulsations is dependent on the slip $s$, the rate of change of this pulsating direct current $E_{dc}$ may be taken as a criterion of the slip or rate of change of phase angle. Of course, at synchronism this direct current voltage $E_{dc}$ is zero. Now if before $E_{dc}$ or some proportion $nE_{dc}$ thereof is zero it can, in effect, be made zero by subtracting therefrom a voltage $$k\frac{dE_{dc}}{dt}$$

proportional to the slip $$\frac{d\theta}{dt}$$

and if the closing operation is started when $$nE_{dc} - k\frac{dE_{dc}}{dt} = 0,$$

the circuit breaker 4 will close at the instant of synchronism. In view of the foregoing, I provide, in accordance with my invention, means for deriving from the sources to be connected the voltage $E_{dc}$ and the voltage $$k\frac{dE_{dc}}{dt}$$

proportional to the rate of change of this voltage, means operative when the difference between these two voltages is zero and means for giving a closing indication when the preceding means operates provided the frequency difference is not excessive.

As shown, the means for deriving the voltage $E_{dc}$ includes potential transformers 9 and 10 connected to the bus side of the circuit breaker 4, a potential transformer 11 connected to the machine side of the circuit breaker and full wave rectifiers 12 and 13. Where necessary or desirable there may be provided insulating transformers 14, 15 and 16 respectively associated with the potential transformers 9, 10 and 11. The connections are such that the resultant of the interphase voltages $B_3B_1$ and $M_1M_2$ is impressed across the terminals 17 and 18 of the rectifier 12 and the resultant of the interphase voltages $B_2B_3$ and $M_1M_2$ is impressed across the terminals 19 and 20 of the rectifier 13. Further the connections are such that the difference between these resultant voltages appears across the terminals 21 and 22 of the rectifiers 12 and 13, respectively. In order to provide a return path for the current derived from this voltage difference, a resistance 23 is connected across the terminals 21 and 24 of the rectifier 12 and a resistance 25 is connected across the terminals 22 and 26 of the rectifier 13.

As shown, the means for obtaining the voltage $$k\frac{dE_{dc}}{dt}$$

proportional to the rate of change of $E_{dc}$ is a transformer 27 which I term an advance transformer. The primary winding 28 of this transformer is connected between the terminals 21 and 22 of the rectifiers 12 and 13, respectively, so as to be energized in accordance with the voltage $E_{dc}$. The primary reactance of this transformer at any frequency within the operating range is small in comparison with the resistance of the primary circuit by reason of the inclusion of resistances 29 and 30. The exciting current of the transformer 27 is accordingly substantially in phase with the applied voltage $E_{dc}$. The construction of the transformer is also such that it does not saturate over the operating range. Inasmuch as $E_{dc}$ does not vary uniformly with the variation in phase angle, particularly when the phase angle is large, it may be desirable in some cases to maintain $$\frac{dE_{dc}}{dt}$$

substantially constant even at large phase angles, that is with large values of $E_{dc}$. For this purpose I may employ a resistance device 31 which is connected, for example, between the rectifier terminal 22 and some point on the resistance 29 and which has an inverse potential-resistance characteristic. Such resistance devices are disclosed, for example, in United States Letters Patent 1,822,742, issued September 8, 1931. Their characteristic, which is non-linear, may be expressed by the equation $I = KE^c$, I and E representing respectively the current in and voltage across the resistance, K being the constant and $c$ a number greater than one. In this way it is possible to increase the primary current disproportionately to the increase of $E_{dc}$ and thereby to maintain the rate of change of primary current or the secondary voltage dependent thereon more nearly constant. It is desirable to be able to adjust the advance time to permit of different circuit breaker closing times. This can be accomplished by varying either $k$ or $n$, or both. It is, however, simple to vary both $k$ and $n$ (the proportion of $E_{dc}$ used) by a tap, for example, on the resistance 29 which may be in series with the resistance device 31 and with the resistance of the primary winding 28. Thus, by moving the tap on this resistance, the proportion of $E_{dc}$ that is used can be increased and $k$ can be decreased in order to decrease the advance time.

$E_{dc}$ consists of one component having a frequency equal to the frequency difference between the two sources to be connected, and of other components of approximately twice the average frequency of these sources. Obviously, it is desirable that these double-frequency components be filtered from $nE_{dc}$ and $$k\frac{dE_{dc}}{dt}$$

before applying their difference to the means which is to operate when the difference is zero. While any suitable filtering means may be used for this purpose, as will be apparent to those skilled in the art, I have chosen to illustrate condensers 33 connected across and resistances 34 connected in series with the difference output circuit 35, that is, the circuit including the resistances 29 and 30 and the transformer secondary 32.

In accordance with my invention the means which is to operate when the difference voltage $$nE_{dc} - k\frac{dE_{dc}}{dt}$$

is zero may be such as to operate regardless of whether the machine frequency or the bus frequency is the greater. Also this means preferably imposes the minimum burden on the potential deriving devices 9, 10 and 11 and the apparatus associated therewith for obtaining the difference voltage. One way to obtain these results in accordance with my invention is to provide a differential control which as shown includes a double-throw differential relay 36 and an electric discharge valve amplifier 37 for controlling the relay 36 in accordance with the voltage difference. As shown the amplifier 37 includes two electric discharge valves 38 and 39 whose control electrodes or grids are respectively connected to the conductors of the voltage difference circuit 35. The grid circuits may include grid leaks 40 and 41. The anode or plate circuits of the valves 38 and 39 include the windings 42 and 43 respectively of the relay 36 and may also include a valve conductivity check relay 44 which is energized by the sum of the plate currents of the valves and which also applies a certain negative bias to the grid of each valve. An adjustable means such as the resistance 45 may be provided to balance the plate current outputs of the valves so that for like excitations of the grids and filaments both valves have the same plate currents. Since the voltage difference $$nE_{dc} - k\frac{dE_{dc}}{dt}$$

is applied across the grids of the valves 38 and 39, the plate current of one or the other of these valves will predominate so to energize one of the windings 42, 43 of the relay 36 as to cause the closing of one of its sets of contacts 46, 47. However, when the voltage difference is substantially zero, as when the closing indication is to be given, the plate current of each valve is the same and the relay goes to the neutral or balanced position with its contacts 46 and 47 open as shown in Fig. 1.

Inasmuch as the relay 36 is a quickly acting sensitive relay, I may transfer its control to an auxiliary relay 48 which, as shown, has circuit opening contacts 49 and circuit closing contacts 50. For this purpose, the winding of the relay 48 may be so arranged as to be short-circuited by the relay 36 whenever either of its contacts 46 or 47 close. This feature not only prevents the pick-up of the relay 48 until the right instant but also by retarding the decay of the flux in the relay delays the drop-out sufficiently to insure the completion of its control action. This is particularly advantageous because after the synchronism indication is given by the relay 36, one of its sets of contacts 46 or 47 is quickly closed as the phase angle changes.

With the foregoing there is associated the phase checking relay 8 which provides means for giving a closing indication within a given phase angle range, which includes synchronism, if the frequency difference does not exceed a predetermined value. For simplicity I have illustrated the relay 8 only schematically since this relay per se is not my invention and since examples of such relays are well known to the art. One such device suitable for this purpose is disclosed in United States Letters Patent 1,680,754, issued August 14, 1928, as the upper relay element 12 which can close its contacts only within a predetermined phase angle each side of synchronism if the frequency difference is less than a predetermined value.

Under the control of the closing indication relay 48, the phase and frequency difference relay 8 and the plate current checking relay 44, I may provide an auxiliary sequence check relay 51 which can become energized only when the lower contacts 49 of the relay 48 are closed and the contacts of the relays 8 and 44 are closed. This can occur only when the relays 8 and 44 operate before the relay 48 is energized. This relay 51 is arranged when it operates to maintain itself energized through its own contacts 52 as long as the contacts of the relays 8 and 44 remain closed. As shown the circuit for the relay 51 may be connected for energization at some intermediate direct current voltage by being connected between the resistances 53 and 54.

For the usual heavy closing duty, I preferably provide a control relay 55 whose contacts 56, as shown, are arranged to control the circuit of the closing coil 7, although it will be apparent that this relay could also control other functions such for example as the speed of the prime mover in a manner well known to the art.

In order not to have the valve circuits continuously excited and also to eliminate the burden on the potential transformers 9, 10 and 11 when the synchronizer is not in use, suitable switching means 57, 58, 59 and 60 may be provided. These can be manually operated and may be such that one synchronizing equipment can serve for all the generators of a station.

Assuming now that the circuit breaker 4 is open and it is desired to close it to connect the source M1, M2, M3 to the bus B1, B2, B3 and that the parts of the synchronizer are positioned as shown in Fig. 1, that is deenergized, filament excitation is applied to the valves 38 and 39 and the plate circuit switch 57 is closed. The switches 58, 59 and 60 may be closed at any time. When the valve filaments are heated sufficiently for the valves to conduct, the relay 44 will operate to close its contacts if the plate circuits of the valves are intact and the grids of the valves will be biased negatively by the voltage drop in the winding of the relay 44.

As long as there is a voltage across the voltage difference circuit 35, one of the valves 38, 39 is biased more positively and the other more negatively. Consequently, the more positively biased valve has the greater plate current and one of the windings 42, 43 of the relay 36 overcomes the other to effect the closing of either the contacts 46 or 47. This prevents the relay 48 from operating until the voltage difference is zero. If prior to the time of operation of the relay 48, the phase and frequency differences were small enough, the relay 8 will have closed its contacts thereby connecting the relay 51 across the resistance 53 through the closed contacts of the relay 44 and the lower contacts 49 of the relay 48. As soon as the relay 51 operates, it closes its own circuit across the contacts 49 of the relay 48 and remains energized as long as the relays 8 and 44 keep their contacts closed.

As the voltage across the circuit 35 approaches zero, the plate currents of the valves 38 and 39 become more nearly equal and finally at the balance point the windings 42 and 43 of the relay 36 move the contact controlling element to the neutral position with both sets of contacts open as shown in Fig. 1. Centering springs, as illustrated, may be used to hold the relay in the neutral position when no forces or equal forces are exerted. The circuit of the relay 48 is then from plus through the auxiliary switch 5, the conductor 61, the switch 57, the conductor 62, the relay 48, the current limiting resistance 63 and the conductor 64 to minus. When the relay 48 closes its contacts 50, it connects the control relay 55 across the resistance 53 in a circuit including the contacts of the relays 8, 44 and 51 and the contacts 50 of the relay 48. The operation of the relay 55 completes the circuit of the closing coil 7. As soon as the voltage across the voltage difference circuit 35 goes through the zero value, the relay 36 operates again to close one of its sets of contacts thereby short-circuiting the relay 48 so that the retardation of flux delays the dropout long enough to insure the completion of the closing action by the relay 55.

In case either of the valves 38 or 39 has failed or been removed such that little or no plate current flows, the relay 44 can still pick up due to the plate current of the sound valve. However, as the voltage difference across the circuit 35 tends to decrease the plate current of this sound valve to zero and thus operate the relays 36 and 48, the relay 44 drops out before these relays operate, and, therefore, the relay 55 cannot become energized to close the circuit breaker.

If a high frequency difference be assumed then the relay 36 operates to open one set of its contacts at a large phase difference before the relay 8 has operated. Consequently, the relay 48 is energized and opens its contacts 49. The relay 36 quickly closes its other set of contacts and the relay 48 drops out with a time delay. As the phase difference decreases, the relay 8 may close its contacts but even though the contacts of the relay 44 are closed and the relay 48 has had time to reclose its contacts 49, nothing more than the energization of the relay 51 can occur. If this does operate and complete its own circuit through the contacts of the relays 8 and 44, the operation of the relay 48 at 180° phase difference will not cause a circuit breaker closing operation because in the meantime the relay 8 has opened its contacts at a predetermined angle after synchronism, thus opening the circuits of the relays 51 and 55.

In the embodiment of my invention shown in Fig. 3, I use as the criterion for synchronism the difference between two corresponding phase voltages, for example $M_1M_2$ and $B_1B_2$. Inasmuch as the angle between these voltages is the quantity sought, it is sufficient to rectify the voltage difference. For this purpose the secondaries 70 and 71 of the insulating transformers 14 and 16 respectively are connected in opposition to the terminals 72, 73 of a rectifier 74. In order to improve the rate of change characteristic at large angles, a saturating reactor 75 in series with this difference circuit may be provided. Across the terminals 76, 77 of the rectifier, there appears a pulsating direct current voltage $E_{dc}$ which is applied to the advance transformer 78 through a high resistance circuit including the transformer primary winding 79 and resistances 80 and 81. By making the primary reactance of the transformer 78, at the frequencies to be met, small in comparison with the resistance of the circuit in which the primary winding 79 is connected, the primary current will vary at a rate proportional to the rate of change of $E_{dc}$ and consequently the voltage across the secondary winding 82 is proportional to $$\frac{dE_{dc}}{dt}.$$

The magnetic circuit of the transformer may have a series air gap to minimize the effects of permeability changes and hysteresis. Instead of varying the proportion of $$\frac{dE_{dc}}{dt}$$

used to adjust the advance time, I may vary the proportion of $E_{dc}$ used by means of the potentiometer resistance 80. If, for example, $n$ and $k$ are so selected that $$nE_{dc} - k\frac{dE_{dc}}{dt} = 0$$

at 45° which is judged the largest angle of advance required in ordinary applications and the circuit breaker closing time is ½ second, then from the equation $$s = \frac{\theta}{t},$$

the maximum permissible slip is ¼ cycle per second. If $\theta_r$ is the angle at which the closing indication is given and $\theta_b$ the angle at which the circuit breaker closes, then $\theta_b = \theta_r - sT$. $\theta_b$ is not zero unless the machine and bus voltages are alike in magnitude. Moreover, if the voltages are unequal, there is a zone around zero slip within which synchronizing cannot occur because $E_{dc}$ does not equal zero at zero phase angle.

In order to synchronize without the necessity of first equalizing the voltages, I provide means for compensating for the difference in magnitude of the voltages of the two sources. With the arrangement shown in Fig. 3, the voltage $E_{dc}$ is compensated by subtracting therefrom a direct current voltage which equals $E_{dc}$ at zero phase displacement. One way to obtain this compensating voltage is to energize rectifiers 83 and 84 respectively in accordance with the bus and machine voltages through suitable means such as the potential and insulating transformers 9 and 11, and 14 and 16 respectively and so to connect these rectifiers as to obtain the difference between the rectified voltages. Each rectifier is provided with a return current resistance 85. Inasmuch as the polarity of the resultant difference voltage is dependent on which source voltage is the greater, the resultant is applied to the terminals 86, 87 of a rectifier 88 across which a smoothing condenser 89 is connected, in order to obtain a voltage of fixed polarity and of magnitude proportional to the arithmetical difference between the voltages. If a voltage proportional to this compensating voltage $E_c$ is subtracted from $nE_{dc}$ the resultant is always zero at zero degrees no matter what the voltages of the sources. Thus, between the terminals 90 and 91 there appears the voltage $E_c$, any desired proportion of which may, by the use of a potentiometer resistance 92, be subtracted from the proportion of $E_{dc}$ which appears between the tap on the resistance 80 and the terminal 93. Across the circuit 94 there appears a voltage which is a measure of the phase angle between the voltages of the sources corrected for the difference between their magnitudes. Obviously, a voltmeter 95, connected in this circuit at any point which may be, for example, in a remote station, as schematically indicated by the broken line conductors, will indicate a voltage which is a measure of the phase difference. Thus the voltmeter 95 will indicate zero at synchronism and the rapidity with which its changes occur will give an indication of the frequency difference. The vector difference minus the arithmetical difference gives a voltage which changes more rapidly in terms of phase angle than the voltage which would be obtained from the arithmetical sum minus the vector sum. It is, therefore, a more sensitive indication of phase angle.

From the foregoing description of Fig. 3, it will now be apparent that the voltage across the terminals 93 and 96 is $E_{dc}$, that across the advance transformer secondary is $$k\frac{dE_{dc}}{dt},$$

that across the terminal 97 and the tap on the resistance 92 is proportional to $E_c$ or $mE_c$, $m$ being a constant, and that between the tap on the resistance 80 and the terminal 93 is $nE_{dc}$. Accordingly the voltage across the voltage control circuit 101, after filtering out the undesired frequencies by suitable means such as the condensers 33 and the resistances 34, is $$nE_{dc} - mE_c - k\frac{dE_{dc}}{dt}.$$

In order to use this resultant voltage in a way which will utilize the devices for obtaining the separate voltages most efficiently and impose the minimum burden on such devices, I provide, further, in accordance with my invention, an electric discharge valve amplifier 98 which is preferably compensated for variations in anode and cathode voltages and so protected that its failure will not cause undesired operation. As shown, the amplifier 98 includes control and compensating valves 99 and 100 respectively, whose outputs control a differential relay 102, illustrated as of the polarized type. The valves may be of the five element type which has a screen grid 103 and a secondary emission suppression grid 104. The relay 102 has a winding 105, an intermediate point of which is connected to the plus side of the direct current control source through a current limiting resistance 106, an anode circuit switch 57 and the circuit breaker auxiliary switch 5. The lower and upper terminals of the winding 105 are connected to the anodes of the valves 99 and 100 respectively. The polarization of the relay 102 and the connections of its winding are such that the relay can operate from the contact controlling position shown to open its contacts 107 and close its contacts 108 only when the effect of the upper portion of its winding in the anode circuit of the control valve 99 predominates over the effect of the lower portion of the winding in the anode circuit of the control valve 99 and a biasing spring 109.

If the control grid 110 of the control valve 99 were allowed to become positive, it would tend to act as an anode and since its current must flow through a comparatively high resistance, the resistances 34 and 82, its voltage would no longer correspond to the open circuit voltage of the resultant voltage circuit 101. This can be prevented by applying a bias to the grid 110 such that up to and somewhat beyond the operating point the grid will be negative and the grid current negligible. Inasmuch as bias batteries are objectionable, the bias may be obtained by means of the voltage drop due to the cathode current flowing through a resistance 112 to the minus side of the control source. The cathodes of the valves 99 and 100 may be connected in series so that if either valve has burned out or been withdrawn, the relay 102 will not be actuated and synchronizing cannot take place. Since the series connection of the cathodes places them at different potentials, thereby tending to unbalance the anode currents, I compensate for this and restore the balance by connecting the control grid 110 of the valve 100 having the more positive filament to a tap on the resistance 112. The filament circuit is provided with a potentiometer resistance arrangement including the resistances 113 and the lower portion of 114.

While with the arrangement shown, operation of the relay 102 occurs at the desired angle in advance of synchronism, I prefer to provide means for preventing operation when the slip is excessive because even perfect synchronizing at high slip causes large current rushes, the advance angle of the synchronizer falls below the desired value at large angles and slips due to the fact that the vector difference is a curve which is approximately straight only for small angles, and the angular error due to a given change in circuit breaker closing time is proportional to slip. As shown, the means provided is an undervoltage relay 115 which is connected across the rectifier 74 to be energized in accordance with the rectified vector difference voltage $E_{dc}$ before filtering. When $E_{dc}$ exceeds a predetermined value the relay 115 operates to open its contacts 116 and close its contacts 117.

In order to prevent false operations if both alternating current sources are suddenly disconnected but the direct current control source is left on, I provide an auxiliary relay 118 which when energized operates instantaneously to open its contacts 119 and close its contacts 120 and which when deenergized operates with a time delay to open the contacts 120 and close the contacts 119. This relay is so connected and arranged that, for synchronizing to be possible, it must first be energized to show a phase difference and then deenergized to show that the phase difference is below a predetermined value. For this purpose it is connected to have its circuit controlled through the contacts 117 of the relay 115.

In order to provide greater current carrying capacity than the contacts of relays of the type of relay 102 have, there is provided a control relay 55 to control the circuit of the closing coil 7. If this relay were controlled only by the relays 102, 115 and 118, it would be possible to obtain late closures around the limiting value of frequency difference because the relay 102 could operate at the desired angle but the relays 115 and 118 might drop out later and the relay 55 would be energized. In order to prevent this I provide the sequence check relay 121 which is connected through the contacts 108 of the relay 102 so that the relays 115 and 118 must operate before the relay 102 operates, otherwise the relay 121 cannot be energized again until after the relay 102 has reset.

In order initially to check the presence of alternating current excitation, I may provide a relay 123 which can become energized only when the relay 115 is energized from the rectifier 74 so that the relay 118 is energized. Without this relay 123, a false synchronizing indication might be given due to unequal heating rates of the valves which could cause a complete cycle of operation of relay 102 in the absence of the controlling voltage of the circuit 101.

There may also be provided suitable means 125 to hold off the relay system until the valves have had time to heat to an equal temperature, and to delay synchronizing until the starting sequence of the prime mover and generator has progressed to a point where the frequency and voltage are stable regardless of whether they are at the desired values since synchronizing at times of rapidly changing frequency difference involves unnecessarily large errors which can be avoided by a few seconds delay. However, as means suitable for these purposes are well known to the art and are not per se my invention, I have indicated them merely schematically by contacts in the plus side of the direct current control source which supplies the relay 55.

Assuming now that the circuit breaker 4 is open and it is desired to close it to connect the source M₁, M₂, M₃ to the bus B₁, B₂, B₃ and that the parts of the synchronizer are positioned as shown in Fig. 3, that is deenergized, direct current excitation is applied by closing the switch 57 and alternating current excitation by closing the switches 58 and 60. It will also be assumed that the conditions to which relay means 125 is to respond have been fulfilled.

If the phase angle is large enough, that is $E_{dc}$ is above the value necessary to pick-up the relay 115, then the relay 118 will have its circuit completed from minus through the conductor 126, the contacts 117 of the relay 115, the conductor 127, the winding of the relay 118, the conductor 128, the contacts of the hold-off relay means 125, the resistance 113, the conductor 129, the switch 57, the conductor 130 and the auxiliary switch 5 to plus. When the relay 118 closes its contacts 120, it completes the circuit of the source check relay 123 from the minus control bus through the conductor 126, the winding of the relay 123, the contacts 120 of the relay 118, the conductor 128, the contacts of the relay means 125, the resistance 113, the conductor 129, the switch 57, the conductor 130 and the auxiliary switch 5 to plus. The relay 123 then completes its own circuit through its contacts 124 so that when the relay 118 drops out due to the drop-out of the relay 115 as the phase difference decreases, the relay 123 remains energized. Also as long as the phase angle exceeds a predetermined value the voltage across the circuit 101 reduces the conductivity of the controlling valve 99, but the plate current of the valve 100 is sufficient so to energize the upper portion of the winding 105 of the relay 102 that this portion predominates over the lower portion whereby to cause the opening of the contacts 107 and the closing of the contacts 108. The closing of the contacts 108 completes the circuit of the relay 121 from minus through the conductor 126, the contacts 116 of the relay 115, the winding of the relay 121, the conductor 131, the contacts 108 of the relay 102, the conductor 132, the contacts 119 of the relay 118, the contacts 124 of the relay 123, the contacts of the relay means 125, the resistance 113, the conductor 129, the switch 57, the conductor 130 and the auxiliary switch 5 to plus. The relay 121 when energized closes its contacts 122 to maintain its circuit after the relay 102 opens its contacts 108 with the change in phase angle.

As the voltage across the circuit 101 decreases, the bias on the control valve 99 decreases and the valve becomes more conductive until its plate current increases sufficiently for the lower half of the winding 105 of the relay 102 to predominate and cause the opening of its contacts 108 and the closing of its contacts 107. As soon as this occurs, the circuit of the closing relay 55 is completed from minus through the conductor 126, the contacts 116 of the relay 115, the winding of the relay 55, the conductor 133, the contacts 107 of the relay 102, the conductor 131, the contacts 122 of the relay 121, the conductor 134, the contacts 119 of the relay 118, the contacts 124 of the relay 123, the contacts of the relay means 125, the resistance 113, the conductor 129, the switch 57, the conductor 130 and the auxiliary switch 5 to plus.

If the frequency difference is too large for synchronizing, the relay 102 opens its contacts 108 before the relays 115 and 118 close their contacts 116 and 119 respectively. Accordingly the circuit of the relay 121 cannot be completed and synchronizing does not occur.

Should the filament circuit be open for any reason, for example, the burn-out of a filament or removal of a valve, then neither of the valves 99 and 100 can conduct. The relay 102, therefore, cannot become energized and its circuit controlling member under the bias of the spring 109 closes the contacts 107. Accordingly synchronizing cannot occur.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, two sources of alternating current, means for connecting said sources and means for controlling the operation of said connecting means including means for deriving from said sources a voltage dependent on the phase difference between the sources and inductive means for deriving from said first voltage a voltage dependent on the rate of change of the first voltage.

2. In combination, two sources of alternating current, means for deriving from said sources a voltage dependent on the phase angle between their electromotive forces, means including a transformer connected to be energized in accordance with said derived voltage for obtaining a voltage dependent on the rate of change of said phase angle and means connected to be controlled in accordance with the difference between said derived voltages.

3. In combination, two sources of alternating current, means for deriving from said sources a voltage dependent on the phase relation of their electromotive forces, means for deriving from said sources a voltage dependent only on the difference between the magnitudes of their electromotive forces and means connected to be controlled in accordance with the difference between said derived voltages.

4. In combination, two sources of alternating current, means for connecting said sources and means for controlling the operation of said connecting means including means for deriving from said sources a voltage dependent on the phase relation of their electromotive forces, means for deriving from said sources a fixed polarity voltage dependent on a comparision of the magnitudes of their electromotive forces and means connected to be controlled in accordance with the difference between said derived voltages.

5. In combination, two sources of alternating current, means for deriving from said sources a direct current voltage dependent on the phase relation of their electromotive forces, means for deriving a fixed polarity direct current voltage dependent on a comparison of the magnitude of their electromotive forces and means connected to be controlled in accordance with the difference between said derived voltages.

6. In combination, two sources of alternating current, means for connecting said sources, means for deriving from said sources a direct current voltage $E_{dc}$ dependent on the phase angle between the electromotive forces, means for deriving a voltage $$\frac{dE_{dc}}{dt}$$

dependent on the rate of change of said phase angle, means for deriving a direct current voltage $E_c$ dependent on the differece in magnitude of the electromotive forces of the sources and means connected to be controlled in accordance with the function $$nE_{dc} - mE_c - k\frac{dE_{dc}}{dt},$$

where $k$, $m$ and $n$ are constants, for starting a closing operation of said connecting means when said function is substantially equal to zero.

7. In combination, two sources of alternating current, means for connecting said sources, and means for controlling the operation of said connecting means including means for deriving from said sources a voltage dependent on the phase difference between the sources, means for deriving a voltage dependent on the rate of change of the phase difference between the sources and means for deriving a continuous voltage dependent on the relative magnitudes of the voltages of the sources.

8. In combination, two sources of alternating current, means for connecting said sources, means for deriving from said sources a voltage dependent on the phase difference between the sources, means for deriving a voltage dependent on the rate of change of the phase difference between the sources, means for deriving a continuous voltage dependent on the relative magnitudes of the voltages of the sources and means for controlling the operation of said connecting means connected to be operated in accordance with a predetermined function of said three derived voltages.

9. In combination, two soures of alternating current, means for deriving from said sources direct current voltage, $E_{dc}$, dependent on the phase angle between their electromotive forces, means for deriving a voltage $$\frac{dE_{dc}}{dt}$$

dependent on the rate of change of said phase angle, means for deriving a direct current voltage $E_c$ dependent on the difference in magnitude of the electromotive forces of the sources and means connected to be controlled in accordance with the function $$nE_{dc} - mE_c - k\frac{dE_{dc}}{dt};$$

$k$, $m$ and $n$ being constants.

10. In combination, two sources of alternating current, an electric circuit, means for impressing on said circuit a direct current voltage dependent on the vector difference of the electromotive forces of said sources and means for impressing on said circuit a direct current voltage dependent only on the difference between the magnitudes of the electromotive forces of said sources.

11. In combination, two sources of alternating current, means for connecting said sources, means for deriving from said sources two voltages respectively dependent on the resultants of a voltage of one source combined separately with each of two voltages of the other source having the same magnitude of phase difference with respect to the voltage of said one source when the sources are in phase and a constant phase difference with respect to each other and means responsive to the relation between said two derived voltages for controlling the operation of said connecting means.

12. In combination, two polyphase sources of alternating current, switching means for connecting said sources, means for deriving from said source two voltages respectively dependent on the vectorial differences between a voltage of one source combined separately with each of two voltages of the other source having the same magnitude of phase difference with respect to the voltage of said one source when the sources are in phase and a constant phase difference with respect to each other and means responsive to the relation between said vectorial difference voltages for controlling the closing operation of said switching means.

13. In combination, two polyphase sources of alternating current, switching means for connecting said sources, means for deriving from said source two voltages respectively dependent on the vectorial differences between a voltage of one source combined separately with each of two voltages of the other source having the same magnitude of phase difference with respect to the voltage of said one source when the sources are in phase and a constant phase difference with respect to each other and means responsive to the difference in magnitude between said two derived voltages for so controlling said connecting means as to effect the connection of said sources when they are substantially in synchronism.

14. In combination, two sources of alternating current, means for connecting said sources, and means for controlling the operation of said connecting means including means for deriving from said sources a voltage dependent on the phase difference between the sources, means for deriving a voltage dependent on the rate of change of the phase difference between the sources, and differentially acting means connected to be controlled in accordance with the difference between said derived voltages.

15. In combination, two sources of alternating current, means for deriving from said sources a voltage dependent on the phase angle between their electromotive forces, means for deriving a voltage dependent on the rate of change of the phase angle between their electromotive forces, an electric discharge valve amplifier including two electric discharge valves each connected to be controlled in accordance with the difference between said derived voltages and means connected to be controlled in accordance with the difference between the outputs of said valves.

16. In combination, two sources of alternating current, means for deriving from said sources a voltage dependent on the phase angle between their electromotive forces, means for deriving a voltage dependent on the rate of change of the phase angle between their electromotive forces, an electric discharge valve amplifier conected to be controlled in accordance with the difference between said derived voltages and differential relay means connected to be controlled by the output of said amplifier.

17. In combination, two sources of alternating current, means for deriving from said sources a voltage dependent on the phase angle between their electromotive forces, means for deriving a voltage dependent on the rate of change of the phase angle between their electromotive forces, an electric discharge valve amplifier including a plurality of electric discharge valves, one being connected to be controlled in accordance with the difference between said derived voltages and means connected to be controlled in accordance with the difference between the outputs of two of said valves.

18. In combination, two sources of alternating current, means for deriving from said sources a voltage dependent on the phase difference between the sources, and means including conducting means having a non-linear volt-ampere characteristic for deriving from said first voltage a voltage substantially directly proportional to the rate of change of the first voltage over a predetermined range of frequency difference between the sources.

19. In combination, two sources of alternating current, means for deriving from said sources a voltage dependent upon the phase angle between their electromotive forces, means connected to be energized in accordance with said derived voltage for obtaining a voltage dependent on the rate of change of said phase angle including conducting means having a non-linear volt-ampere characteristic for maintaining a substantially linear relation between said derived voltage and the rate of change of said phase angle, and means connected to be controlled in accordance with the difference between said derived voltages.

20. In combination, two sources of alternating current, means for deriving from said sources a direct current voltage dependent on the vector difference of their electromotive forces, means including conducting means having a non-linear volt-ampere characteristic for deriving from said direct current voltage a voltage substantially proportional to the rate of change of phase angle between the voltages of said alternating current sources over a predetermined range of phase angle between the sources, means for deriving a fixed polarity direct current voltage dependent on the difference in magnitude of their electromotive forces, and means connected to be energized in accordance with a predetermined function of said three derived voltages.

HAROLD T. SEELEY.